United States Patent [19]

Nakamura et al.

[11] Patent Number: 5,449,771
[45] Date of Patent: Sep. 12, 1995

[54] METHOD FOR RECOVERING CYCLODEXTRIN

[75] Inventors: Nobuyuki Nakamura, Mishima; Mikio Yamamoto; Hideyuki Sumiyoshi, both of Fuji, all of Japan

[73] Assignee: Nihon Shokuhin Kako Co., Ltd., Tokyo, Japan

[21] Appl. No.: 217,287

[22] Filed: Mar. 24, 1994

[30] Foreign Application Priority Data

Mar. 31, 1993 [JP] Japan .................................. 5-096887
Aug. 17, 1993 [JP] Japan .................................. 5-223776

[51] Int. Cl.⁶ ........................ C08B 37/16; C08B 30/18
[52] U.S. Cl. ...................................... 536/103; 536/46; 536/127
[58] Field of Search ........................ 536/103, 127, 46

[56] References Cited

U.S. PATENT DOCUMENTS

| | | | |
|---|---|---|---|
| 4,303,787 | 12/1981 | Horikoshi et al. | 536/103 |
| 4,880,573 | 11/1989 | Courregelongue et al. | 260/420 |
| 5,063,077 | 11/1991 | Vollbrecht et al. | 426/614 |
| 5,232,725 | 8/1993 | Roderbourg et al. | 426/417 |
| 5,264,226 | 11/1993 | Graille et al. | 426/34 |
| 5,264,241 | 11/1993 | Graille et al. | 426/664 |

FOREIGN PATENT DOCUMENTS

| | | |
|---|---|---|
| 0475451 | 9/1991 | European Pat. Off. . |
| 60-9524 | 3/1985 | Japan . |
| 63-41595 | 2/1988 | Japan . |
| 3-14896 | 1/1991 | Japan . |
| 3-49647 | 3/1991 | Japan . |
| 3-130039 | 6/1991 | Japan . |
| 4-93399 | 3/1992 | Japan . |
| 4-229158 | 8/1992 | Japan . |
| WO91/16824 | 11/1991 | WIPO . |

OTHER PUBLICATIONS

Abstract in English for Japanese Patent No. 4-93399.
Abstract in English for Japanese Patent Application No. 54-68589.

*Primary Examiner*—Nathan M. Nutter
*Attorney, Agent, or Firm*—Beveridge, DeGrandi, Weilacher & Young

[57] ABSTRACT

A method for recovering cyclodextrin, comprising passing an aqueous solution containing an inclusion compound of cyclodextrin with a guest compound, through a non-polar, high-porous hydrophobic adsorption resin, which is the cross-linked copolymer of styrene with divinylbenzene, comprised of styrene as a basic skeleton, to cause the adsorption resin to preferentially adsorb the guest compound for its removal. The method enables economical recovery of cyclodextrin in a good efficiency and at a high purity from inclusion compounds of cyclodextrin with guest compounds such as cholesterol and other lipids.

10 Claims, 2 Drawing Sheets ed through the resin, measured when a treating material-A aqueous suspension was passed through "DIAION HP-20" resin at 40° C. and pH 9.

METHOD FOR RECOVERING CYCLODEXTRIN

FIELD OF THE INVENTION

This invention relates to a method for recovering cyclodextrin (hereinafter "CD") from inclusion compounds (or clathrate compounds) of CD with a guest compound. More particularly, it is concerned with a method for recovering CD from inclusion compounds of CD with cholesterol and/or other lipids, formed as by-products during the preparation of cholesterol reduced edible fats, oils or eggs, which method comprises removing cholesterol and/or other lipids from edible fats, and oils or egg yolk by the aid of CD.

BACKGROUND OF THE INVENTION

In recent years, an increase in the ingestion of food with high cholesterol has caused a serious increase in adult diseases such as arteriosclerosis and hypertension due to hypercholesterolemia. Under such circumstances, it is strongly sought to develop food with low cholesterol. In particular, with regard to animal fats and oils such as butter or eggs, which are pointed out as high-cholesterol foods, it is desired to remove cholesterol contained therein.

As methods therefor, in recent years, methods in which inclusion compounds with cholesterol are formed using various types of CD, in particular, $\beta$-CD composed of 7 molecules of glucose, in order to remove cholesterol from the foods are proposed, and have been already put into practical use (see Japanese Patent Applications Laid-open No. 63-41595, No. 3-14896, No. 3-49647, No. 3-130039, No. 4-93399 and No. 4-229158, WO91-16824, and U.S. Pat. No. 5,063,077).

These methods have made it easy to produce low-cholesterol foods. However, there is almost no report on methods by which CD is recovered in a good efficiency from inclusion compounds of CD with cholesterol and other lipids, obtained as by-products.

Accordingly, a method in which an aqueous suspension of such inclusion compounds is heated to dissociate them into CD, and cholesterol and other lipids, followed by centrifugal separation to recover the respective components has been hitherto employed for the sake of convenience (Japanese Patent Application Laid-open No. 3-14896).

In order to recover CD in a higher purity, a method is also proposed in which a mixture of the inclusion compounds of CD with cholesterol and other lipids is treated with an organic solvent, such as alcohol or hexane, to make cholesterol and other lipids soluble so that they can be recovered (Japanese Patent Application Laid-open No. 4-229158 and WO91-16824).

However, in the method in which an aqueous suspension of the inclusion compounds is heated and thereafter centrifuged, it is difficult to sort and recover the respective components, and about 5 to 10% (w/w) of cholesterol or lipids remain in the CD thus recovered. Hence, it has been impossible for the CD recovered, not only to be reused for the removal of cholesterol, but also to be used for other general purposes.

The method in which a mixture of the inclusion compounds is treated with an organic solvent requires the organic solvent in a large quantity, reaction equipment of an explosion-proof type and a solvent recovery apparatus of a large scale. This method can not be said to be economical.

SUMMARY OF THE INVENTION

The present invention was made taking account of the above problems. An object of the invention is to provide a method for recovering high-quality CD with ease and in an economically good efficiency, from inclusion compounds formed as by-products when low-cholesterol fats and oils or egg yolks are produced using CD.

To achieve the above object, the present inventors made intensive studies. As a result, they have discovered that the CD can be recovered in a good efficiency from a solution having passed through a specific adsorption resin so that cholesterol and other lipids are preferentially adsorbed thereon, under such conditions that the inclusion compounds of CD with cholesterol and other lipids may substantially undergo dissociation and no precipitate of such inclusion compounds may be formed.

The CD recovery method of the present invention comprises passing an aqueous solution containing an inclusion compound of cyclodextrin with a guest compound, through a non-polar, high-porous hydrophobic adsorption resin, which is the cross-linked copolymer of styrene with divinylbenzene, comprised of styrene as a basic skeleton, to cause the adsorption resin to preferentially adsorb the guest compound for its removal.

In the present invention, an aqueous solution containing inclusion compounds of CD with guest compounds such as cholesterol and other lipids is passed through a non-polar, high-porous hydrophobic adsorption resin comprised of styrene as e basic skeleton, under such conditions that the inclusion compounds may substantially undergo dissociation and no precipitate of such inclusion compounds may be formed, so that the guest compounds can be preferentially adsorbed and hence the CD can be recovered in a good efficiency from the solution having passed through the resin.

This resin is known to be capable of adsorbing not only the guest compounds but also CD (see Japanese Patent No. 1,286,959). However, the CD has a smaller adsorbability to the resin than the guest compounds, such as cholesterol and other lipids, so that the guest compounds are preferentially adsorbed and hence any possible adsorption of the CD on the resin has little influence on the recovery efficiency.

Thus, the present invention makes it possible to recover CD with ease and economical advantages, from inclusion compounds of CD with guest compounds such as cholesterol and other lipids. In the present invention, the lipids other than the cholesterol may include various kinds of fatty acids such as caproleic acid and lauroleic acid and glycerides of these.

DESCRIPTION OF THE PREFERRED EMBODIMENTS

Figure 1:
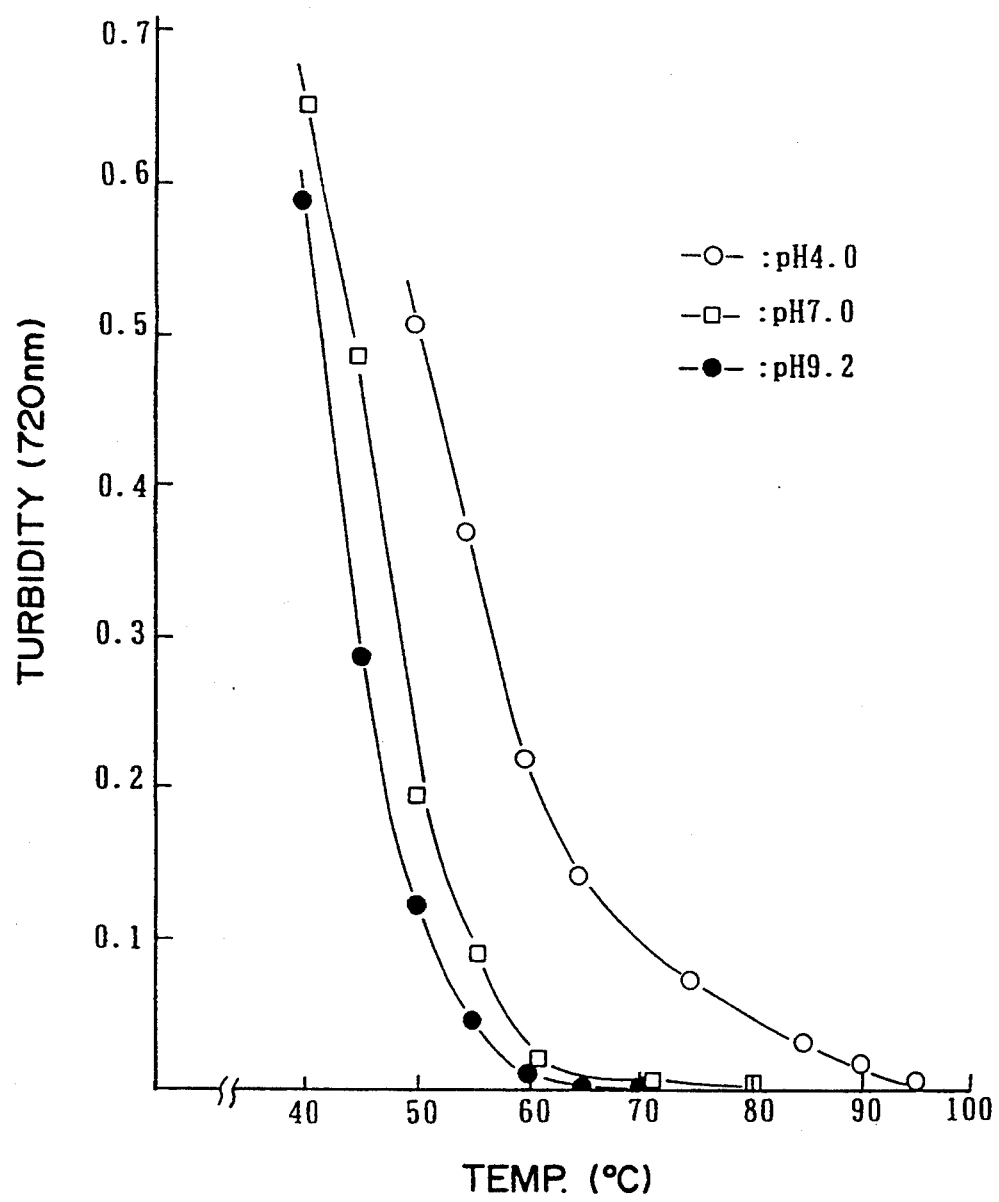
FIG. 1 shows the influence which the solution temperature and pH have on the formation of inclusion compounds.

The present invention is concerned with a method for recovering cyclodextrin by selectively removing guest compounds from inclusion compounds of cyclodextrin with the guest compounds. In particular, it is a method effective when the guest compounds are cholesterol and other lipids. In the present invention, the starting material inclusion compounds of cyclodextrin with guest compounds such as cholesterol and other lipids can be readily prepared by the methods as disclosed in the aforesaid Japanese Patent Applications Laid-open No. 63-41595, No. 3-14896, No. 3-49647, No. 3-130039, No. 4-93399 and No. 4-229158, WO91-16824, end U.S. Pat. No. 5,063,077). In this case, as the CD, not only $\beta$-CD but also various kinds of CDs or mixtures thereof can be used.

The adsorption resin used in the present invention may be any of non-polar, high-porous hydrophobic adsorption resins comprised of styrene as a basic skeleton, and there are no particular limitations on the specific surface area, average pore size or particle diameter of the resin. Commercially available resins having such features may include, for example, DUOLITE S-866, S-872, S-874 and S-876 (trade names, non-polar, highly porous, hydrophobic styrene based resins available from Diamond Shamrock Corp.), AMBERLITE XAD-2, XAD-4 and XAD-2000 (trade names, non-polar, highly porous, hydrophobic styrene based resins available from Rhom & Hass Go.), and DIAION HP-10, HP-20, HP-30, HP-40 and HP-50 (trade names, non-polar, highly porous, hydrophobic styrene based resins available from Mitsubishi Chemical Industries Limited).

In the present invention, a solution containing inclusion compounds of CD with guest compounds are passed through the above resin under such conditions that inclusion compounds may substantially undergo dissociation and no precipitate of the inclusion compounds may be formed, so that the guest compounds are preferentially adsorbed thereon, and it become possible to separately recover the CD. Herein, what is meant by "inclusion compounds have substantially undergone dissociation" is that a greater part, preferably not more than 85%, of the chemical combination of CD with guest compounds has broken up.

There are no particular limitations on how to pass the aqueous solution of inclusion compounds through the resin. As conventionally done, it is preferable to pass the solution at a constant rate through a resin packed in a column, from the upper part or lower part of the column.

The inclusion compounds in the aqueous solution may preferably be in a concentration of from about 5 to (w/v), taking account of economical advantages and/or operability.

When the aqueous solution of inclusion compounds is passed through the adsorption resin, the temperature may be a temperature at which the inclusion compounds may substantially undergo dissociation and no precipitate of such inclusion compounds may be formed, and preferably 50° C. or above.

The aqueous solution of inclusion compounds being passed through the resin may preferably have a pH of from 2 to 12, and more preferably from 3 to 10, since an excessively acidic or alkaline solution may cause decomposition of CD. The inclusion compounds of CD with cholesterol and other lipids have a higher degree of dissociation under alkaline conditions than under acidic conditions, and hence the solution may most preferably be passed in neutrality to weak alkalinity of from about pH 7 to about pH 10.

With regard to the velocity of the solution being passed, a higher velocity is more economical. In general, it may preferably be SV = 1 to 10 in approximation.

Known methods may be used to recover the CD from the solution having passed through the adsorption resin. For example, the passed solution containing CD may be decolored using activated carbon, followed by desalting with an ion-exchange resin and then concentrating to obtain a concentrated solution containing CD. This concentrated solution may further be dried by spray drying to obtain a CD powder. The concentrated solution also may further be subjected to crystallization, through which crystal CD can be recovered.

Meanwhile, in instances in which the solution having passed through the adsorption resin is reused for the removal of cholesterol, the above operations for purification are unnecessary. The passed solution can be reused as it is. A material powdered by, e.g., spray drying of the passed solution or a crystallized material from the concentrated mother liquor thereof, can also be reused substantially without any difficulty.

As for the guest compounds such as cholesterol and other lipids adsorbed on the resin, they can be recovered by known methods. For example, they can be readily eluted from the resin by passing through it an alcohol such as methanol or ethanol in an amount 3 to 5 times the volume of the resin, and then the solvent in the solution may be evaporated. Thus, they can be recovered with ease. In instances in which it is unnecessary to recover the guest compounds, the resin may be washed with a sodium hydroxide solution. Thus the resin can be repeatedly reused.

The present invention will be described below in greater detail by giving Examples.

EXAMPLE 1

Studies were made on various kinds of adsorption resins to examine how they are effective for removing cholesterol and other lipids from inclusion compounds of CD with cholesterol and other lipids, having been used to remove cholesterol from milk fat.

First, 1.1 kg of $\beta$-CD, CELDEX-N (trade name; available from Nihon Shokuhin Kako Co., Ltd.; water content: 104) and 20 kg of anhydrous milk fat were pre-kneaded at room temperature for 20 minutes, followed by addition of 20 liters of hot water (50° C.) and then vigorous stirring in a stream of nitrogen for 20 minutes to form inclusion compounds of $\beta$-CD with cholesterol and other lipids. After left to stand for 20 minutes, the mixture was centrifuged to separate it into an oil layer and an aqueous layer containing inclusion compounds. To the resulting aqueous layer fraction, sodium hydroxide was added to adjust its pH to 9.5, followed by heating and boiling for 30 minutes to dissociate the inclusion compounds in their greater part. Subsequently, while the temperature was kept high, centrifugal separation was carried out to collect a greater part of cholesterol and lipids dissociated from the inclusion compounds. An aqueous suspension containing the remaining $\beta$-CD was spray-dried to obtain a crude $\beta$-CD powder with a water content Of 9.64%.

This crude $\beta$-CD powder contained a carbohydrate containing 0.1% of protein, 0.7% of cholesterol, 5.9% of lipids, 0.6% of inorganic salts and 92.7% of $\beta$-CD.

The cholesterol was extracted from the sample by reflux extraction making use of chloroform, and thereafter its quantity was measured by gas chromatography as disclosed in Japan Food Industry Society, "Food Analysis", page 571, published by Korin, 1982. The quantity of lipids in the sample after solvent extraction was measured by the method as disclosed in Japanese Patent Application Laid-open No. 3-14896.

Subsequently, hydrochloric acid was added to about 10% (w/v) crude β-CD suspension to adjust its pH to 7, which was then heated and boiled for 30 minutes, followed by filtration while it was hot, using diatomaceous earth as a filter aid to remove cholesterol, lipids and also other insoluble matter. Thus, an about 9.6% (w/v) treating material solution was prepared. This solution was designated as treating material-A solution.

Next, to 90 ml of the above treating material-A solution, 6 ml (when swollen) of various kinds of adsorption resins were each added, followed by stirring at 80° C. which was maintained for 20 minutes. The concentration of solid matter in the aqueous solution obtained by filtration of the resin while the solution was hot was adjusted to a Brix degree of 1.5 (28° C.) by adding pure water, and thereafter the resulting solution was left to stand at 20° C. for 3 days, where the presence of inclusion compounds thus produced was measured at 720 nm using water as a control, and was indicated as turbidity.

For comparison, β-CD not formed into inclusion compounds, CELDEX-N (trade name; available from Nihon Shokuhin Kako Co., Ltd.; purity: 98.8%), and treating material-A solution not treated with adsorption resin were similarly treated, and the turbidity of the solutions thus treated was also measured. An apparent rate of removal of cholesterol and lipids was also calculated from the turbidity of the treating material-A solution and the turbidity of the solution having been treated with the adsorption resin. Results obtained are shown in Table 1.

which the inclusion compounds of β-CD are formed and which form precipitates can be preferentially adsorbed, though a slight difference in adsorbability is seen, without regard to the differences in specific surface area and average pore size of the resin. On the other hand, high-porous adsorption resins comprised of acrylate as a basic skeleton and having resin surfaces of a medium polarity can slightly adsorb cholesterol and other lipids, but show a very low adsorption performance compared with the non-polar, high-porous hydrophobic adsorption resin, which is the cross-linked copolymer of styrene with divinylbenzene, comprised of styrene as a basic skeleton of the present invention. Adsorption resins having hydrophilic resin surfaces slightly adsorb cholesterol and other lipids under the same conditions.

The treating material-A solution not passed through the column is transparent immediately after it has been subjected to filtration while it was hot. Since, however, none of the guest compounds such as cholesterol and other lipids are removed, precipitates of inclusion compounds of β-CD with them are produced immediately after the liquid temperature has dropped.

Experiment

Studies were made on the temperature and pH of the solution passed through the adsorption resin in the working of the present invention.

To the treating material-A solution prepared in Example 1, sodium hydroxide or hydrochloric acid was added to adjust its pH to 9.2, 7.0 or 4.0, followed by addition of pure water to give an about 7.5% (w/v) solution. Next, the resulting solution was heated at various temperatures for 30 minutes, and its turbidity was immediately measured at 720 nm. Results obtained are shown in FIG. 1.

As is clear from FIG. 1, when the treating material-A solutions have the same concentration, their turbidity

TABLE 1

| Resin | Basic skeleton | Surface polarity | Specific surface area ($m^2/g$) | Average pore size (Å) | Turbidity (720 nm) | Removal rate (%) |
|---|---|---|---|---|---|---|
| Hydrophobic: | | | | | | |
| DUOLITE S-861 | Styrene | Non-polar | 600 | 38 | 0.012 | 98.2 |
| DUOLITE S-866 | " | " | 500–550 | 50–55 | 0.107 | 83.6 |
| DUOLITE S-872 | " | " | 300 | 90 | 0.108 | 83.4 |
| DUOLITE S-874 | " | " | 725 | 50 | 0.137 | 79.0 |
| DUOLITE S-876 | " | " | 750 | 100 | 0.057 | 91.3 |
| AMBERLITE XAD-2 | " | " | 280–320 | 80 | 0.033 | 94.9 |
| AMBERLITE XAD-4 | " | " | 700–800 | 30 | 0.029 | 95.6 |
| AMBERLITE XAD-2000 | " | " | 620 | 45 | 0.015 | 97.7 |
| DIAION HP-10 | " | " | 501 | — | 0.015 | 97.7 |
| DIAION HP-20 | " | " | 718 | — | 0.006 | 99.1 |
| Medium: | | | | | | |
| DUOLITE S-877 | Acrylate | Medium | 450 | 90 | 0.504 | 22.7 |
| DUOLITE S-878 | " | " | 160 | 225 | 0.453 | 30.5 |
| AMBERLITE XAD-7 | " | " | 350–500 | 80 | 0.478 | 26.7 |
| AMBERLITE XAD-8 | " | " | 120–200 | 180 | 0.450 | 30.0 |
| Hydrophilic: | | | | | | |
| DUOLITE S-761 | Phenol | Phenol OH g. | 100–200 | 30–40 | 0.645 | 1.0 |
| DUOLITE S-771 | Triazine | Amine | 200–300 | 25–30 | 0.648 | 0.6 |
| Control: | | | | | | |
| β-CD | | | | | 0.000 | 100 |
| Treating material-B solution | | | | | 0.652 | 0 |

As is seen from the results shown in Table 1, when the non-polar, high-porous hydrophobic adsorption resin comprised of styrene as a basic skeleton is used, the guest compounds (cholesterol and other lipids) with becomes lower as the pH of the solution is higher. In other words, the data show that the inclusion compounds are more dissociated as the pH becomes higher.

When the solutions had a constant pH, the turbidity became lower as the temperature was higher. Meanwhile, at temperatures of lower than 50° C., precipitates of inclusion compounds of β-CD with cholesterol and other lipids were produced and, when the solution was passed through the resin, not only no sufficient preferential adsorption of the cholesterol and other lipids took place, but also the columns clogged, making it impossible to carry out the present invention.

This shows that, when a treating material solution with a concentration of from 5 to 10% (w/v) that can commonly be prepared with ease is used and the materials are treated under mild conditions of about pH 3 to 10 at which the β-CD can be stable in the treating material solution, the solution should preferably be passed through the resin at a temperature of not lower than 50° C. and not higher than the boiling point (about 100° C.).

EXAMPLE 2

Quality of CD recovered by the method of the present invention was examined in comparison with the quality of CD recovered by a conventional method.

First, 1,200 ml (solid matter: 116 g) of about 9.6% (w/v) treating material-A solution prepared in Example 1 was passed through about 200 ml (when swelled) of a hydrophobic non-polar styrene based resin DUOLITE S-876 (trade name; available from Diamond Shamrock Corp.) packed in a column, at 85° C. and a flow velocity of 640 ml/hr (SV=3.2), and thereafter the resin was washed with about 600 ml of pure water (85° C.). The resin-passed solution and the resin-washed solution were put together and thereafter the combined solution was divided into two equal parts, one of which was then concentrated to dryness under reduced pressure to obtain crystalline powder. This was designated as sample 1.

The other of the solution divided into two equal parts was concentrated up to about 40% (w/v) under reduced pressure to obtain crystals, which was thereafter further left to stand at 4° C. for 3 days to well deposit crystals of β-CD. Next, the crystals thus formed were obtained by filtration and then washed with a small quantity of pure water (4° C.), followed by hot-air drying at 65° C. for 3 days to obtain crystals of β-CD. This was designated as sample 2.

For comparison, 600 ml of treating material-A solution was concentrated to dryness under the same conditions as sample 1 to obtain sample 3. Also, 600 ml of treating material-A solution was crystallized under the same conditions as sample 2 to obtain sample 4.

Next, on each sample, the weight of the resulting solid matter, the water content (loss on drying), the recovery of solid matter based on treating materials, the content of β-CD in solid matter, the percentage of solvent-extracted fractions such as cholesterol and other lipids, and the turbidity obtained by measuring at 720 nm the amount of inclusion compounds produced after the solution diluted to 1.5% (w/v) by adding water was left to stand at 20° C. while stirring at intervals were measured and the state of solution was visually observed. Results obtained are shown in Table 2. As a control, the above properties were also similarly measured on β-CD, CELDEX-N (trade name; available from Nihon Shokuhin Kako Co., Ltd.).

TABLE 2

| Sample | Properties | Weight (g) | Water content (%) | Recovery (%) | β-CD (%) | Solvent-extracted fraction (%) | Turbidity (720 nm) | State of solution |
| --- | --- | --- | --- | --- | --- | --- | --- | --- |
| Present invention: | | | | | | | | |
| 1 | Crystalline powder | 56.3 | 4.1 | 93.1 | 97.4 | 0.04 | 0.003 (0.5%)* | Transparent |
| 2 | Crystals | 53.4 | 4.3 | 88.1 | 99.7 | 0.02 | 0.001 (0.2%)* | Transparent |
| Conventional method: | | | | | | | | |
| 3 | Crystalline powder | 61.0 | 5.4 | 99.5 | 97.7 | 0.67 | 0.650 (100%)* | Cloudy |
| 4 | Crystals | 55.0 | 4.4 | 91.1 | 99.1 | 0.59 | 0.586 (100%)* | Cloudy |
| Control: | | | | | | | | |
| β-CD | Crystals | — | 10.3 | — | 98.8 | 0 | 0 | Transparent |

*Relative turbidity (%) assuming the turbidity of Samples 3 and 4 as 100.

As shown in Table 2, according to the present invention, the cholesterol and other lipids contained in the treating material-A were preferentially adsorbed on the non-polar, high-porous hydrophobic adsorption resin comprised of styrene as a basic skeleton, so that it was possible for the host molecule β-CD of the inclusion compounds to be recovered in a good efficiency from the solution passed through the resin. In addition, the resulting β-CD had substantially the same quality as β-CD not formed into inclusion compounds. Moreover, the adsorption of β-CD on the resin was in a very small quantity, where only about 2.5% of the β-CD in the treating material was adsorbed.

On the other hand, in the solution not passed through the resin, cholesterol and other lipids remained in a large quantity, which formed inclusion compounds. Hence the solution was cloudy, and the β-CD was considered not reusable for the removal of cholesterol.

EXAMPLE 3

Adsorbability of the adsorption resin used in the present invention was measured.

The treating material-A solution prepared in Example 1 was diluted to about 7% (w/v) by adding water, and then passed through about 70 ml (when swelled) of a hydrophobic, non-polar styrene based resin DIAION HP-20 (trade name, available from Mitsubishi Chemical Industries Limited) packed in a column, at 70° C. and a flow velocity of 350 ml/hr (SV=5), and the resulting resin-passed solution was sampled with time. Subsequently, hydrochloric acid was immediately added to adjust the pH to 4.0. Thereafter, the solution was diluted to a Brix degree of 1.5 by adding pure water, and then left to stand at 20° C. for 3 days. The precipitation of inclusion compounds deposited as a result of this operation was measured at 720 nm and was indicated as relative turbidity assuming as 100 that of treating material-A solution similarly treated and using water as a control. Results obtained are shown in FIG. 2.

Figure 2:
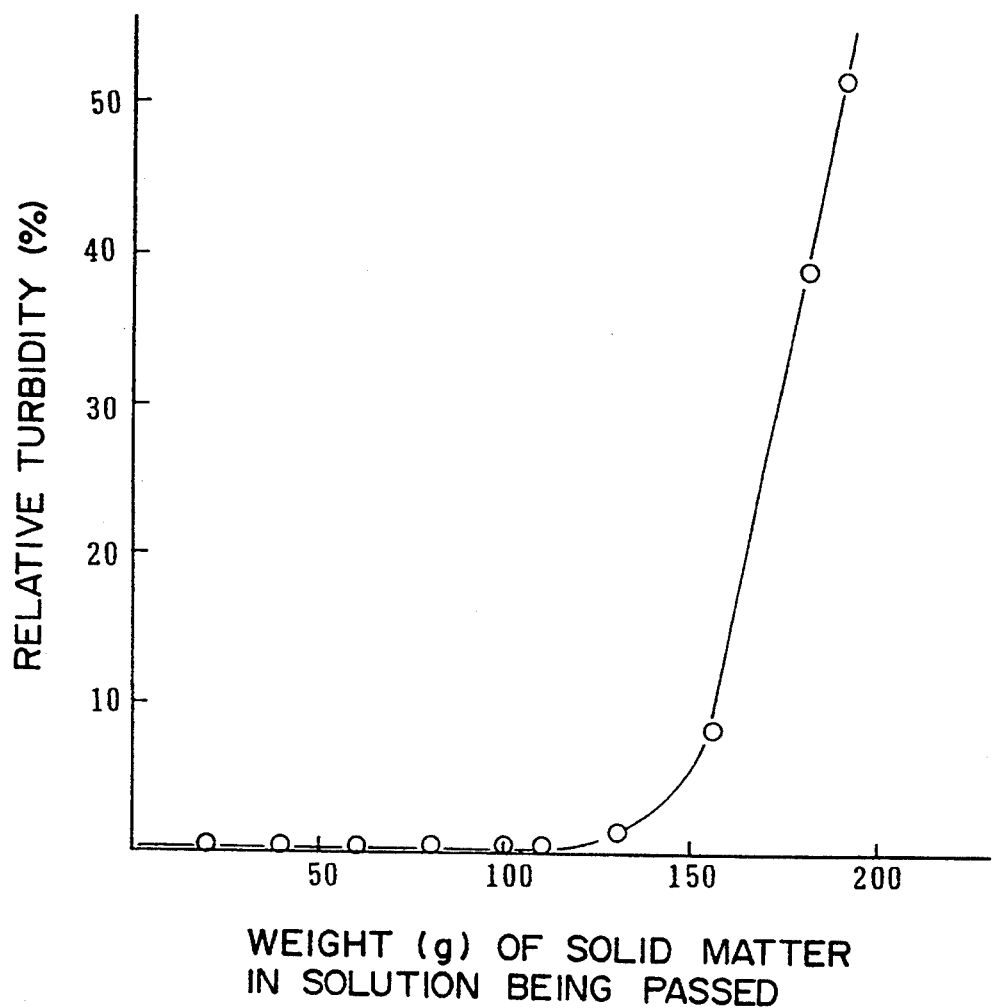
FIG. 2 shows the relationship between the weight of solid matter in a treating material-A solution being passed through "DIAION HP-20" resin (a highly porous, non-polar, hydrophobic styrene and divinylbenzene copolymer available from Mitsubishi Chemical Industries, Ltd.), and the turbidity of the solution having been passed.

As is clear from FIG. 2, according to the present invention, the use of the hydrophobic, non-polar styrene based resin DIAION HP-20 made it possible to treat the treating material-A in a quantity about 1.6 to 2 times (as solid matter) the volume of the resin per batch (when swollen).

Three fractions of the solution passed through the resin were also collected, containing solid matter in an amount of 0 to 110 g, 111 to 160 g and 161 to 190 g, respectively, and thereafter concentrated to about 40% (w/v) under reduced pressure to obtain crystals of β-CD, which was thereafter further left to stand at 4° C. for 3 days to well deposit crystals of β-CD. The crystals thus formed were collected by filtration and then washed with a small quantity of pure water (4° C.), followed by hot-air drying at 65° C. for 3 days. The samples thus obtained were designated as sample 5, sample 6 and sample 7, respectively.

Using these samples, the properties, the weight, the content, the recovery with respect to treating materials (solid matter), the content of β-CD, the percentage of solvent-extracted fractions and the turbidity were measured and also the state of solution was observed, in the same manner as in Example 2. For comparison, these were similarly measured and observed also on β-CD and sample 4 prepared in Example 2. Results obtained are shown in Table 3.

The β-CD as used in Example 1 was replaced with 2.5 kg (solid matter) of CELDEX T-50 (trade name; available from Nihon Shokuhin Kako Co., Ltd.; a spray-dried product; the product contains about 17% of α-CD, 21% of β-CD, 7% of γ-CD and 55% of reducing sugars) to carry out treatment under the same conditions as in Example 1. Thus a crude CELDEX T-50 powder with a water content of 6.8% was obtained. This crude CELDEX T-50 powder contained a carbohydrate containing 0.1% of protein, 0.7% of cholesterol, 6.1% of lipids, 0.6% of inorganic salts and 92.5% of CD. The subsequent treatment was carried out in the same manner as in Example 1 to prepare an about 9.0% (w/v) treating material solution. This was designated as treating material-B solution.

Next, 2,000 ml (solid matter: 180 g) of the treating material-B solution was passed through about 100 ml (when swelled) of a hydrophobic, non-polar styrene based resin DUOLITE S-861 (trade name; available from Diamond Shamrock Corp.) packed in a column, at 95° C. and a flow velocity of 200 ml/hr (SV=2), and thereafter the resin was washed with about 300 ml of pure water (95° C.). The resin-passed solution and the resin-washed solution were put together and the combined solution was concentrated to dryness under reduced pressure to obtain crystalline powder. This was designated as sample 8.

For comparison, 2,000 ml of treating material-B solution was concentrated to dryness in the same manner as

TABLE 3

| Sample | Properties | Weight (g) | Water content (%) | Recovery (%) | β-CD (%) | Solvent-extracted fraction (%) | Turbidity (720 nm) | State of solution |
| --- | --- | --- | --- | --- | --- | --- | --- | --- |
| Present invention: | | | | | | | | |
| 5 | Crystals | 103.3 | 3.5 | 90.6 | 99.8 | 0.07 | 0.001 (0.2%)* | Transparent |
| 6 | Crystals | 45.8 | 3.3 | 90.4 | 99.7 | 0.08 | 0.013 (2.2%)* | Transparent |
| 7 | Crystals | 27.3 | 3.4 | 90.9 | 99.6 | 0.12 | 0.016 (2.7%)* | Transparent |
| Conventional method: | | | | | | | | |
| 4 | Crystals | 55.0 | 4.4 | 91.1 | 99.1 | 0.59 | 0.586 (100%)* | Cloudy |
| Control: | | | | | | | | |
| β-CD | Crystals | — | 10.3 | — | 98.5 | 0 | 0 | Transparent |

*Relative turbidity (%) assuming the turbidity of Sample 4 as 100.

As is clear from Table 3, the data show that according to the present invention the inclusion compounds of β-CD with cholesterol and other lipids can be treated in an amount more than the factor of at least 1 as solid matter based on the adsorption resin regarded as 1, and crystal β-CD with a high purity can be recovered with ease in a good efficiency from the inclusion compound thus treated.

EXAMPLE 4

The quality of CD recovered using a CD mixture in place of β-CD was examined.

sample 8 to obtain crystalline powder. This was designated as sample 9.

On these samples, the weight of resulting solid matter, the water content (loss on drying), the recovery of solid matter based on treating materials, the content of CD in solid matter, the percentage of solvent-extracted fractions in solid matter and the turbidity were measured and the state of solution was visually observed in the same manner as in Example 2. As a control, the above properties were also similarly measured on CELDEX T-50 (cyclodextrins with reducing sugars available from Nihon Shokuhin Kako Co., Ltd.). Results obtained are shown in Table 4. The turbidity was measured on each sample diluted to 3% (w/v).

TABLE 4

| Sample | Properties | Weight (g) | Water content (%) | Recovery (%) | CD (%) | Solvent-extracted fraction (%) | Turbidity (720 nm) | State of solution |
| --- | --- | --- | --- | --- | --- | --- | --- | --- |
| Present invention: | | | | | | | | |
| 8 | Crystalline powder | 168.7 | 4.5 | 89.5 | 42.5 | 0.02 | 0.001 (0.1%)* | Transparent |

TABLE 4-continued

| Sample | Properties | Weight (g) | Water content (%) | Recovery (%) | CD (%) | Solvent-extracted fraction (%) | Turbidity (720 nm) | State of solution |
|---|---|---|---|---|---|---|---|---|
| Conventional method: | | | | | | | | |
| 9 | Crystalline powder | 186.8 | 4.7 | 98.9 | 41.8 | 0.27 | 0.715 (100%)* | Cloudy |
| Control: | | | | | | | | |
| CELDEX T-50 | Powder | — | 6.5 | — | 45 | 0 | 0 (0) | Transparent |

*Relative turbidity (%)

As is clear from Table 4, the use of a CD mixture brought about no difficulties to carry out the present invention. Although the content of CD in the total solid matter thus recovered decreased because of adsorption of part of CD on the resin, there were no problems on quality, and the CD was reusable for the removal of cholesterol. On the other hand, with regard to the solution not passed through the resin, the solution was cloudy, and the CD was considered difficult to be re-used for the removal of cholesterol or for other purposes.

EXAMPLE 5

In an instance in which lard was used in the preparation of the treating materials, the quality of CD recovered by the method of the present invention was examined.

To 2 kg of lard, 200 g (water content: 10.5%) of β-CD was added, and the mixture was pre-kneaded at 50° C. for 10 minutes, followed by addition of 3,000 ml of hot water (60° C.) and then vigorous stirring in a stream of nitrogen for 30 minutes to form inclusion compounds of β-CD with a cholesterol and other lipids. Next, after being left to stand for 20 minutes, the mixture was centrifuged to separate it into an oil layer and an aqueous layer containing inclusion compounds. To the resulting aqueous layer fraction, sodium hydroxide was added to adjust its pH to 9.5, followed by heating and boiling for 30 minutes to dissociate the inclusion compounds in their greater part. Subsequently, while the temperature was kept high, centrifugal separation was carried out to collect a greater part of cholesterol and lipids dissociated from the inclusion compounds. Next, the remaining aqueous fraction was collected end then boiled at 100° C. for 30 minutes, followed by filtration while it was hot, using diatomaceous earth as a filter aid to remove cholesterol end also other lipids. Thus, an about 6% (w/v) treating material solution was prepared. This was designated as treating material-C solution.

Next, 1,000 ml (solid matter: 60 g) of the treating material-C solution was passed through about 50 ml (when swelled) of a hydrophobic non-polar styrene based resin DIAION HP-20 (trade name, available from Mitsubishi Chemical Industries Limited) packed in a column, at 90° C. and a flow velocity of 250 ml/hr (SV=5), end thereafter the resin was washed with 150 ml of pure water (90° C.). The resin-passed solution and the resin-washed solution were put together end the combined solution was concentrated to dryness to obtain crystalline powder. This was designated as sample 10.

For comparison, 1,000 ml of treating material-C solution was concentrated to dryness in the same manner as sample 8. This was designated as sample 11.

On these samples, the weight of solid matter, the water content, the recovery, the content of β-CD, the percentage of solvent-extracted fractions and the turbidity were measured and the state of solution was visually observed in the same manner as in Example 2. Results obtained are shown in Table 5.

TABLE 5

| Sample | Properties | Weight (g) | Water content (%) | Recovery (%) | β-CD (%) | Solvent-extracted fraction (%) | Turbidity (720 nm) | State of solution |
|---|---|---|---|---|---|---|---|---|
| Present invention: | | | | | | | | |
| 10 | Crystalline powder | 61.7 | 4.9 | 97.8 | 97.1 | 0.03 | 0.01 (0.1%)* | Transparent |
| Conventional method: | | | | | | | | |
| 11 | Crystalline powder | 62.5 | 5.1 | 98.9 | 97.8 | 0.56 | 0.615 (100%)* | Cloudy |

*Relative turbidity (%)

As shown in Table 5, although the purity was lower than that of treating materials because of adsorption of part of β-CD on the resin, the solution of β-CD recovered by the method of the present invention was transparent, and the cholesterol and other lipids were substantially removed.

EXAMPLE 6

In an instance in which egg yolk was used in the preparation of the treating materials, how various adsorption resins were effective for the removal of cholesterol was studied.

The egg yolk was pretreated by the SKW method (see U.S. Pat. No. 5,063,077) with a slight modification. More specifically, 50 hen's eggs were cracked to obtain 905 g of egg yolk, to which 0.1M NaCl solution was added in an equal amount (905 g), followed by thorough mixing with stirring by means of a mixer. Thereafter, the resulting mixture was centrifuged at 4° C. and 6,000 rpm for 15 minutes to remove insoluble matter. Thus, 1,554 g of an egg solution was obtained.

To this egg solution, 108 g (wet weight) of β-CD, CELDEX-N (trade name; available from Nihon Shokuhin Kako Co., Ltd.) was added, followed by stirring for 60 minutes to form inclusion compounds of β-CD with cholesterol. Subsequently, the mixture was centrifuged at 4° C. and 6,000 rpm for 15 minutes to obtain 333.2 g (in terms of solid matter) of a precipitate containing inclusion compounds. This was analyzed to reveal that the recovery of egg yolk was 79.4%, the rate of cholesterol removal with respect to the collected solid content was 73.9%, and the rate of cholesterol removal with respect to the egg yolk was 7.9%.

To 8.8 g of the above precipitate (β-CD: 3.81 g), about 80 ml of water was added to suspend the former in the latter, followed by heating in a boiling water bath for 20 minutes. Thereafter, filtration was carried out using diatomaceous earth RADIOLITE SPECIAL FLOW (trade name; available from Showa Chemical Industry Co., Ltd.) as a filter aid to obtain 120 ml of a filtrate with a Brix degree of about 3 (solid content: 3.60 g).

Next, in a test tube, various adsorption resins were each weighed in an amount of 1 g, and 5 ml of the above filtrate was added thereto, followed by adsorption treatment at 90 to 95° C. for 1 hours, with stirring at intervals. After the adsorption treatment was completed, the resin was removed by filtration with a filter paper, and the resulting filtrate was diluted to a Brix degree of 1.6. Thereafter, the dilute solution was left to stand at room temperature (about 24° C.) for 20 hours, where the presence of inclusion compounds thus produced was measured at 720 nm using water as a control, and was indicated as turbidity.

For comparison, a filtrate not treated with adsorption resin was similarly treated, and the turbidity of the filtrate thus treated was also measured. An apparent rate of removal of cholesterol and lipids was also calculated from the turbidity of the filtrate not treated with adsorption resin and the turbidity of the filtrate having been treated with the adsorption resin. Results obtained are shown in Table 6.

adsorption performance also on the cholesterol and other lipids originating from egg yolk.

EXAMPLE 7

To 10 g of a precipitate (β-CD: 4.33 g) prepared in the same manner as in Example 6, about 150 ml of water was added to suspend the former in the latter, and the suspension was heated at 125° C. for 3 minutes in an autoclave, followed by filtration using diatomaceous earth comprised of equal weights of RADIOLITE #800 (trade name; available from Showa Chemical Industry Co., Ltd.) and RADIOLITE SPECIAL FLOW (trade name; available from Showa Chemical Industry Co., Ltd.) as a filter aid, to obtain 200 ml of a filtrate with a Brix degree of about 3 (solid content: 3.98 g).

This filtrate was passed through about 20 ml (when swelled) of a hydrophobic non-polar styrene based resin DIAION HP-20 (trade name, available from Mitsubishi Chemical Industries Limited) pecked in a column, at 85 to 90° C. and a flow velocity of 100 ml/hr (SV=5), and thereafter the resin-passed solution was concentrated to dryness.

In the foregoing treatment, solutions having not been filtered, having been filtered and having been passed through the column were sampled to measure the content of β-CD, the turbidity and the rate of removal of cholesterol and lipids. Results obtained are shown in Table 7.

TABLE 7

|  | β-CD content (%) | Turbidity (720 nm) | Removal rate (%) |
| --- | --- | --- | --- |
| Before filtration: | 45.6 | Unmeasurable | — |
| After filtration: | 99.2 | 0.431 | — |
| After treatment with HP-20: | 99.3 | 0.059 | 86.3 |

As shown in Table 7, the treatment with HP-20 made it possible to remove nearly 90% of cholesterol and lipids. The β-CD thus recovered also had substantially the same quality as β-CD not formed into inclusion compounds.

TABLE 6

| Resin | Basic skeleton | Surface polarity | Specific surface area (m²/g) | Average pore size (Å) | Turbidity (720 nm) | Removal rate (%) |
| --- | --- | --- | --- | --- | --- | --- |
| Hydrophobic: | | | | | | |
| DUOLITE S-861 | Styrene | Non-polar | 600 | 38 | 0.134 | 68.9 |
| DUOLITE S-866 | " | " | 500–550 | 50–55 | 0.022 | 94.9 |
| DUOLITE S-872 | " | " | 300 | 90 | 0.090 | 79.1 |
| DUOLITE S-874 | " | " | 725 | 50 | 0.008 | 98.1 |
| DUOLITE S-876 | " | " | 750 | 100 | 0.146 | 66.1 |
| AMBERLITE XAD-4 | " | " | 700–800 | 30 | 0.060 | 86.1 |
| AMBERLITE XAD-2000 | " | " | 620 | 45 | 0.016 | 96.3 |
| DIAION HP-10 | " | " | 501 | — | 0.013 | 97.0 |
| DIAION HP-20 | " | " | 718 | — | 0.003 | 99.3 |
| Medium: | | | | | | |
| DUOLITE S-877 | Acrylate | Medium | 450 | 90 | 0.121 | 71.9 |
| DUOLITE S-878 | " | " | 160 | 225 | 0.178 | 58.7 |
| AMBERLITE XAD-7 | " | " | 350–500 | 80 | 0.038 | 81.2 |
| Control: | | | | | | |
| (Filtrate not treated with adsorption resin) | | | | | 0.431 | 0 |

As is clear from the results shown in Table 6, the non-polar, high-porous hydrophobic adsorption resin comprised of styrene as a basic skeleton shows a good

Comparative Example

An egg solution obtained by pretreating egg yolk in the same manner as in Example 6 was passed through the same column as that in Example 7, and the solution having been passed therethrough was analyzed to reveal that the recovery of egg yolk was 86.6%, the rate of cholesterol removal with respect to the solid content was 1.15%, and the rate of cholesterol removal with respect to the egg yolk was 13.8%. These results show that the adsorption resin itself has no ability of selectively removing cholesterol and other lipids from egg yolk. Thus, the advantage of the present invention that the cholesterol and other lipids are selectively caged and removed from egg yolk by the use of $\beta$-CD and the cholesterol and other lipids are removed from the resultant inclusion compounds by the use of the adsorption resin has been ascertained.

As described above, according to the present invention, an aqueous solution containing inclusion compounds of CD with guest compounds such as cholesterol and other lipids is passed through a non-polar, high-porous hydrophobic adsorption resin comprised of styrene as a basic skeleton, under such conditions that the inclusion compounds may substantially undergo dissociation and have been solubilized, so that the guest compounds can be preferentially adsorbed and hence the CD can be recovered in a good efficiency from the solution having passed through the resin. Thus, it becomes possible to recover CD with a high purity from inclusion compounds of CD with cholesterol and/or other lipids obtained as by-products when, for example, cholesterol and other lipids contained in edible fats and oils or egg yolks are removed and decreased using CD, and to reuse the recovered CD for the removal of cholesterol or for other purposes. This makes it possible to provide fats and oils or egg yolks with a low cholesterol at an industrially low cost in the field of food industry.

What is claimed is:

1. A method for recovering cyclodextrin, comprising passing an aqueous solution consisting essentially of an inclusion compound of cyclodextrin with a guest compound, through a non-polar, high-porous hydrophobic adsorption resin, at a temperature not lower than 50° C. and not higher than the boiling point of said aqueous solution, wherein said resin is a cross-linked copolymer of styrene with divinylbenzene, comprised of styrene as a basic skeleton, to cause the adsorption resin to preferentially adsorb the guest compound for its removal, wherein said inclusion compound is present in said aqueous solution in a concentration from 5 to 10% (w/v), and the aqueous solution has a pH in the range from 2 to 12.

2. The method according to claim 1, wherein said guest compound is at least one member selected from the group consisting of cholesterol, fatty acids, and glycerides of fatty acids.

3. The method according to claim 1, wherein said aqueous solution of an inclusion compound being passed through said adsorption resin has a pH of from 3 to 10.

4. The method according to claim 1, wherein said guest compound adsorbed on said adsorption resin is recovered by passing through said adsorption resin an alcohol in an amount 3 to 5 times the volume of said adsorption resin.

5. The method according to claim 1, wherein the pH is in the range from 7 to 10.

6. The method according to claim 2, wherein the guest compound is caproleic acid.

7. The method according to claim 2, wherein the guest compound is lauroleic acid.

8. The method according to claim 2, wherein the guest compound is a glyceride of caproleic acid.

9. The method according to claim 2, wherein the guest compound is a glyceride of lauroleic acid.

10. The method according to claim 1, wherein the guest compound is cholesterol.

* * * * *